J. Shaw.

Metals.

No. 1651. Reissued Apr. 5, 1864.

Witnesses.
J. W. Coombs
Henry Morris

Inventor.
J. Shaw
per Munn & Co
Attorneys

UNITED STATES PATENT OFFICE.

JEHYLEMAN SHAW, OF BRIDGEPORT, CONNECTICUT.

IMPROVED APPARATUS FOR SAVING SILVER, &c., FROM WASTE SOLUTIONS.

Specification forming part of Letters Patent No. 35,842, dated July 8, 1862; Reissue No. 1,361, dated April 5, 1864.

*To all whom it may concern:*

Be it known that I, JEHYLEMAN SHAW, of Bridgeport, in the county of Fairfield and State of Connecticut, have invented a new and Improved Apparatus for Saving Silver, &c., from Waste Solutions; and I do hereby declare that the following is a full, clear, and exact description thereof, which will enable any person skilled in the art to make and use the same, reference being had to the accompanying drawings, forming a part of this specification, in which—

Figure 1:
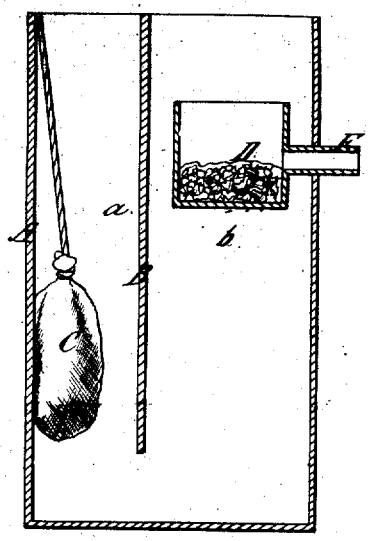
Figure 2:
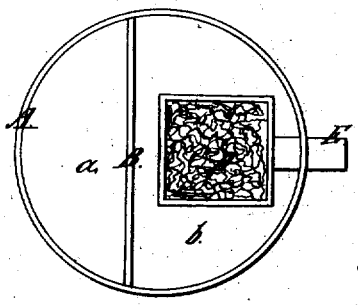

Figure 1 represents a vertical central section of my invention. Fig. 2 is a horizontal section of the same.

Similar letters of reference in both views indicate corresponding parts.

This invention consists in the employment or use, either in combination with the basin or sink into which persons using solutions of gold or silver suffer them to be wasted, or, in place of said sink or basin, of a vessel so arranged and constructed that the waste solution while running through said vessel shall be brought in contact with such chemicals or metals, which will cause the whole or any part of the silver or gold contained in said solutions to be precipitated and retained in said vessel, while the worthless material is allowed to escape.

It consists further in the use of a partition or its equivalent in said vessel or sink for the purpose of forcing the precipitated silver or gold to the bottom and preventing it from being drawn by the force of the current directly to the filter or outlet.

It consists, finally, in the employment of a filter or its equivalent, in combination with the sink or vessel, in which the waste solution collects in such a manner that said filter will retain such particles of silver or gold which might still float in the liquid after being brought in contact with the chemicals and passing under the partition.

A represents a vessel made of sheet metal, china, glass, or any other suitable material, round, square, or in any other desirable shape or form. This vessel may either be used in place of said sink or basin in which the waste solutions containing silver or gold collect, or it may be used in combination with said sink, and so arranged that the liquid escaping from the sink will pass through the same. This vessel or sink is provided with a partition, B, which extends down from its top to within a short distance of its bottom, as clearly shown in Fig. 1 of the drawings, and divides the same in two compartments, *a b*, which communicate with each other through its open space under said partition.

C is a bag which is suspended from a cord in that compartment of the vessel A which is intended to receive the waste solution. This bag is filled with proto-sulphate of iron or some other suitable material capable of retaining the small particles of gold or silver that may be contained in the solution.

By means of the partition B all the liquid poured into the compartment *a* is compelled to pass down to the bottom before it can reach the compartment *b*, and the silver or gold contained in said solution will be precipitated on the bottom of the vessel A, and prevented from being floated off by the current. Such particles of gold or silver, however, which may still be held in suspension in the liquid as the same reaches the compartment *b* are retained by the filter D, which is situated in this compartment. This filter may be made of wood or any other suitable material, and it may be constructed in various ways, either open at the bottom and inclosed on all other sides, or open at the top. In the first case the waste-pipe E will be inserted near the top, and immediately underneath the waste-pipe will be stretched a cloth strainer and a layer of cotton batting, and the space below the cotton batting will be filled with sawdust, which is to be held in place by another clothes-strainer stretched across the bottom of the box. In the second case—that is, when the box C is open on top and closed at the bottom—the waste-pipe would be placed near the bottom and the box would be filled up near to its top with cotton batting, sawdust, or other suitable material.

Thus arranged, the vessel A may be connected with the waste-pipe of the sink or basin into which solutions containing silver or gold are wasted, and in such a position that the waste from the sink shall fall into that compartment of the vessel in which the bag C is suspended. As the solutions containing gold or silver collect in the vessel A and come in contact with the bag containing protosulphate of iron, a chemical action takes place and the silver or gold contained in the solution is precipitated. As the vessel fills the surplus water and the worthless liquid passes through the filter and out at the waste-pipe E, the filter preventing small particles of silver or gold from floating off. The vessel A, however, may be used in place of the ordinary sink, and by collecting the waste solutions in the compartment *a* of the same the silver or gold contained in said solutions is percipitated or retained by the filter and the worthless liquid only allowed to escape through the waste-pipe E.

The vessel A can be relieved of the silver or gold which has been precipitated at any time and the metal subjected to a refining process. The bag C has to be replenished from time to time, as the chemicals contained therein will be gradually dissolved.

What I claim as new, and desire to secure by Leters Patent, is—

1. The employment or use, either in combination with the basin or sink into which persons using solutions of gold or silver suffer them to be wasted, or, in place of said sink or basin, of a vessel, A, so arranged in combination with a bag, C, or its equivalent, that the waste solutions in running through said vessel shall be brought in contact with such chemicals or metals, which will cause the whole or any part of the silver or gold contained in said solutions to be precipitated and retained in said vessel while the worthless material is allowed to escape.

2. The use of the partition *B* in the vessel or sink A, which serves to collect the waste solutions containing gold or silver, substantially as herein described, so that the silver or gold is forced down to the bottom and prevented from being carried off by the current of the liquid.

3. The filter D, applied in combination with the vessel or sink A, in which the waste solutions collect, substantially in the manner set forth, so that said filter will retain such particles of silver or gold which may still be kept in suspension in the liquid.

JEHYLEMAN SHAW.

Witnesses:
EDWARD M. PRESBREY,
DANIEL BOSTWICK.